J. R. SNYDER.
STEAM ENGINE REVERSING GEAR.
APPLICATION FILED MAR. 25, 1916.
1,212,830.
Patented Jan. 16, 1917.
3 SHEETS—SHEET 1.
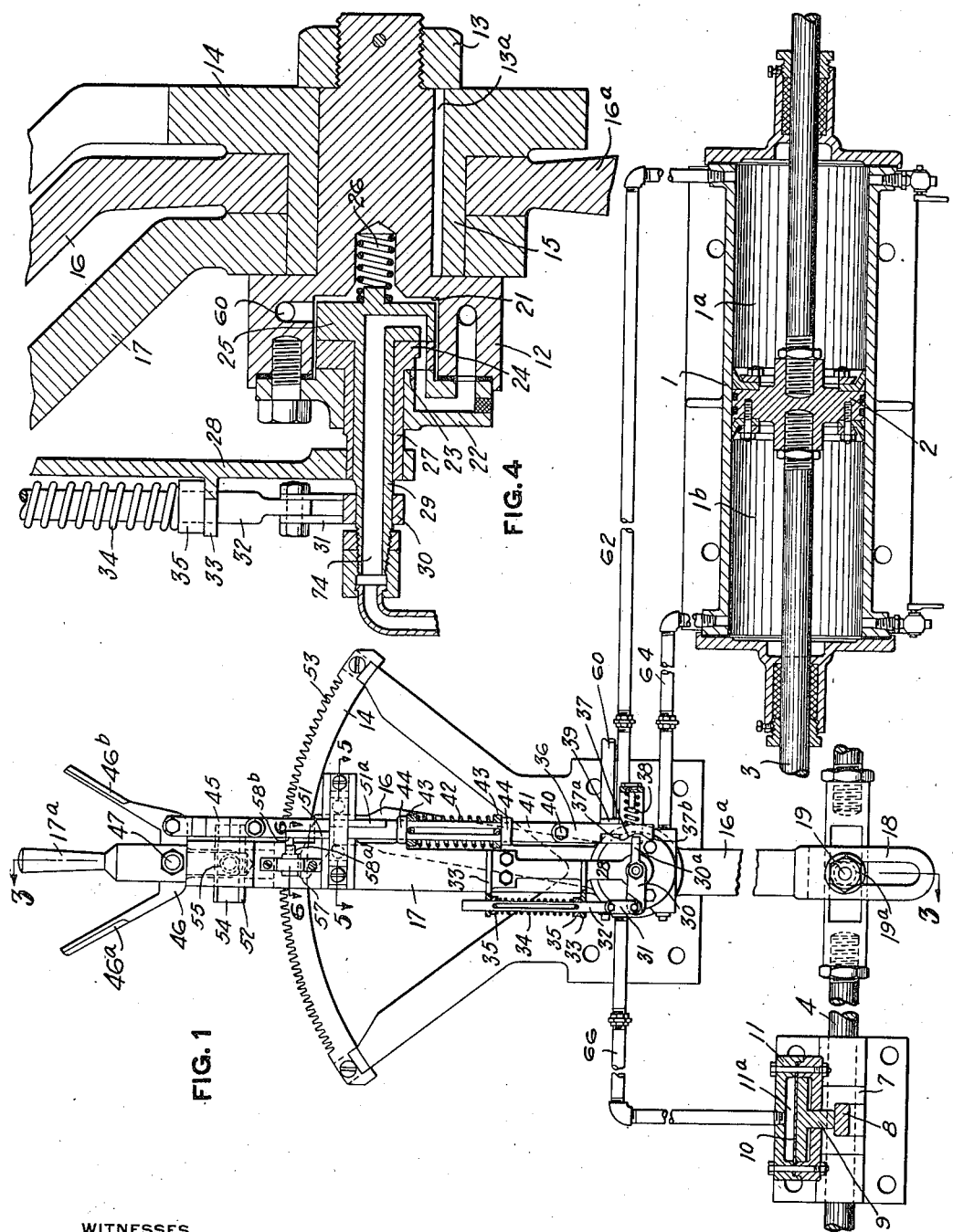
WITNESSES
INVENTOR J. R. SNYDER.
STEAM ENGINE REVERSING GEAR.
APPLICATION FILED MAR. 25, 1916.
1,212,830.
Patented Jan. 16, 1917.
3 SHEETS—SHEET 2.
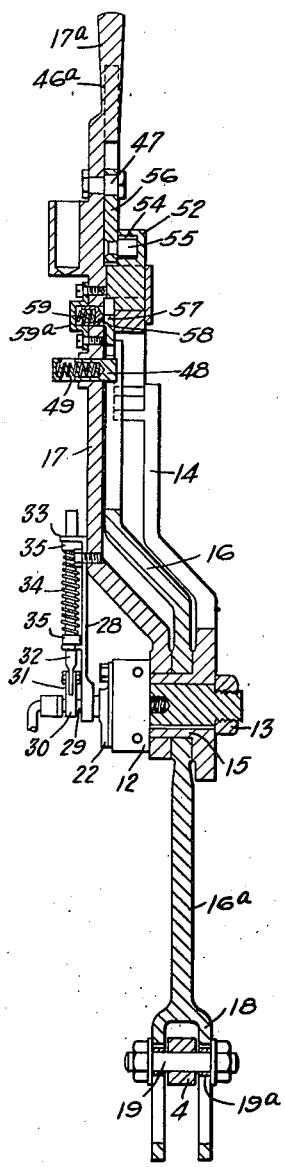
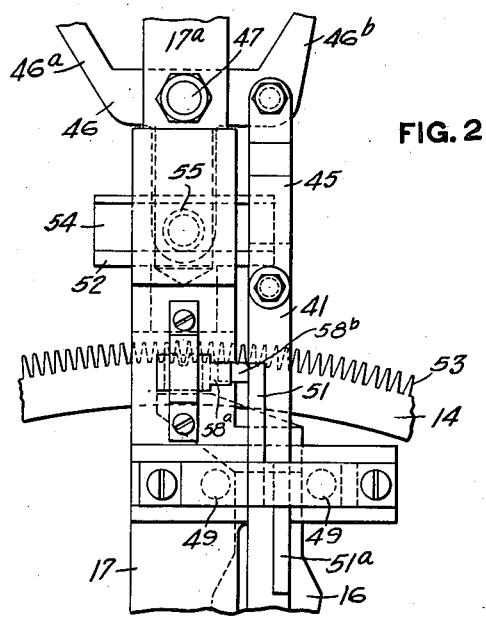
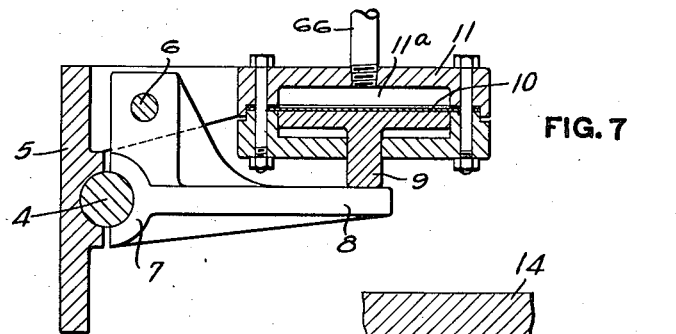
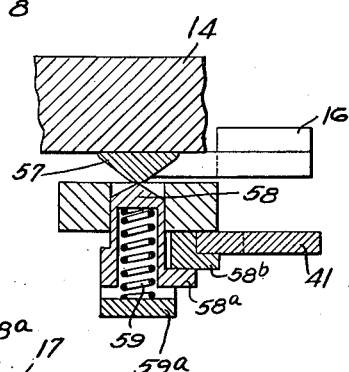
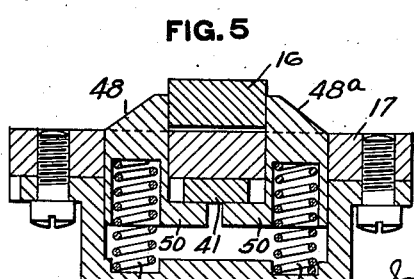
WITNESSES
INVENTOR J. R. SNYDER.
STEAM ENGINE REVERSING GEAR.
APPLICATION FILED MAR. 25, 1916.
1,212,830.
Patented Jan. 16, 1917.
3 SHEETS—SHEET 3.
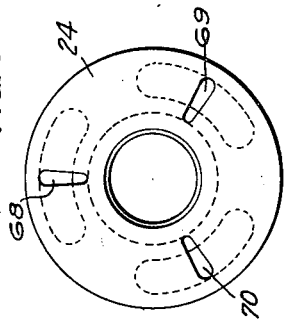
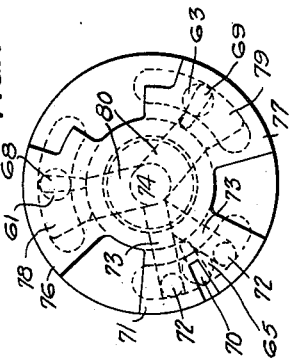
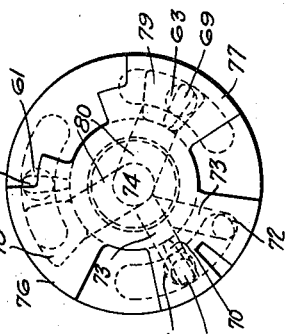
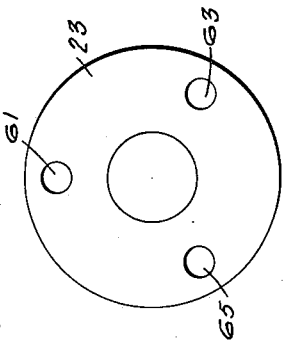
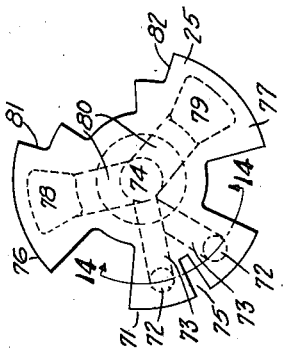
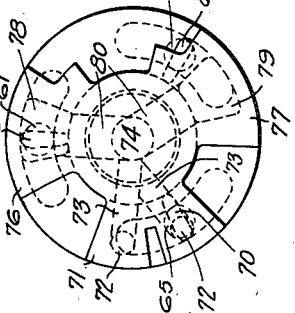
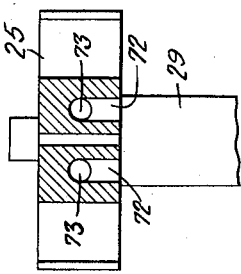
WITNESSES
INVENTOR

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

STEAM-ENGINE REVERSING-GEAR.

1,212,830.

Specification of Letters Patent.

Patented Jan. 16, 1917.

Application filed March 25, 1916. Serial No. 86,679.

*To all whom it may concern:*

Be it known that I, JACOB RUSH SNYDER, a resident of Pittsburgh, in the county of Allegheny and State of Pennsylvania, have invented a new and useful Improvement in Steam-Engine Reversing-Gear, of which the following is a specification.

This invention relates to mechanism for operating the reversing gear of steam engines, such as locomotives.

The object of the invention is to provide fluid actuated mechanism for moving the usual valve gear and which is so arranged as to insure positive movement of the valve gear without danger of any kickback to the engineer, which will prevent the valve gear from being moved farther than intended, and which is so arranged that the valve gear reversing rod cannot move until the actuating handle has been set and locked in the desired position.

A further object of the invention is to provide mechanism of the character described in which the parts cannot bind due to carelessness of the engineer, or move out of place due to the vibration of the locomotive, and so that the valve reversing gear can be operated by hand should the power mechanism become inoperative from any cause.

The invention comprises the construction and arrangement of parts hereinafter described and claimed.

In the accompanying drawings, Figure 1 is a vertical sectional view through the reversing cylinder and the locking device for the reversing rod and showing the valve mechanism and its actuating means in elevation; Fig. 2 is an elevation on an enlarged scale of a portion of the actuating means shown in Fig. 1; Fig. 3 is a vertical section on the line 3—3, Fig. 1, showing the valve mechanism in outside view; Fig. 4 is a section through the valve mechanism on an enlarged scale; Fig. 5 is a horizontal sectional view on the line 5—5, Fig. 1; Fig. 6 is a similar view on the line 6—6, Fig. 1; Fig. 7 is a sectional view through the reversing rod locking device; Figs. 8, 9 and 10 are plan views respectively of the seat, the first or lower rotary disk, and the second or upper rotary disk of the valve mechanism; Figs. 11, 12 and 13 are plan views looking down on the second or upper rotary disk, and showing in dotted lines the various ports, passages and cavities of both disks and of the valve seat, and showing the valve mechanism respectively in normal release and lock application position, and in the two lock release and cylinder application positions; Fig. 14 is a section on the line 14—14, Fig. 10; and Fig. 15 is an elevation showing a modification of the handle grip for actuating the valve mechanism.

In the drawings, 1 represents a reversing cylinder in which works the piston 2 whose piston rod 3 is connected to the usual reversing or reach rod 4 which in turn is connected to the usual reversing link mechanism of the engine, not illustrated. In neutral position the piston 2 stands midway of the length of the cylinder 1, and when it is moved in one direction, the link mechanism is moved to, say, drive the engine forwardly, while when the piston 2 is moved in the opposite direction, the link mechanism is moved to drive the engine backwardly. These movements of the piston are secured by admitting an exhausting fluid pressure alternately to and from the opposite ends of the cylinder. The valve mechanism and its actuating means are so arranged as to prevent admission of pressure fluid to the reversing cylinder until the valve actuating means has been fully moved to the desired position, and in addition a locking device is provided for preventing movement of the piston and locking the reversing rod at all times except when fluid pressure is admitted to the cylinder to move the reversing link mechanism, in order to prevent a kickback which might injure the engineer or moving the reversing rod farther than desired and entirely irrespective of any delay or pause on the part of the engineer after starting to set the valve mechanism, and also to prevent accidental movement of the parts after being set.

The rod locking device shown is in the form of a clamp embracing the reversing rod 4 and comprises a stationary member 5 having pivotally connected thereto at 6 the gripping jaw 7 which is provided with an arm or extension 8 arranged to be actuated by a projection 9 on a movable abutment in the form of a metal diaphragm 10 mounted in the small cylinder 11 and arranged to have motive fluid supplied to one face of said movable abutment, as in the chamber $11^a$, in order to drive the projection 9 against the arm 8 and cause the jaw 7 to grip the reversing rod 4.

A special valve and actuating means therefor is provided for admitting pressure to and exhausting it from the opposite ends of the cylinder 1 and also admitting pressure to and exhausting it from the cylinder 11 of the locking device. This valve mechanism comprises a member 12 which is secured by means of nut 13 and key $13^a$ to the stationary segment 14 and is provided with a circular hub 15 on which are rotatably mounted a locking bar 16 and the valve actuating handle 17. The locking bar 16 has integral therewith a downwardly projecting arm $16^a$ which is provided at its lower end with a slotted fork 18 straddling the reversing rod 4 and engaging a pin 19 extending through said rod and carrying anti-friction rollers $19^a$ which engage the slots of the fork 18, so that the movement of the reversing rod by the power cylinder 1 imparts movement to the arm $16^a$ and locking bar 16, and vice versa.

The member 12 is provided with a valve chamber 21 which is closed at its outer end by the head 22 whose inner face forms the seat 23 of the valve. Working on this seat is the first or lower disk 24 whose opposite face in turn forms a seat for the top or second rotary disk 25. The rotary disks are held to the seat and against each other by a compression spring 26. The disk 24 is provided with a hollow stem 27 which projects through the head 22 and has secured to its outer end an arm or bracket 28 which is secured to the actuating handle 17, so that the angular movement of said handle carries with it the first or lower rotary disk 24. The inner or upper rotary disk 25 is also provided with a hollow stem 29 which extends through the hollow stem 27 of disk 24, and has secured to its outer end a double armed member 30, one arm of which is connected by link 31 to a rod 32 slidably mounted in brackets 33 carried by the handle 17, and shown as extensions from the arm or bracket 28. Surrounding rod 32 is a helical spring 34, abutting at its opposite ends against collars 35 pinned to said rod and each abutting against a bracket 33. The arrangement is such that no matter in which direction the member 30 is rotated, the spring 34 is put under compression, and therefore serves, when released, to restore the member 30, and with it the top of graduating rotary disk 25, to normal position relative to disk 24. The opposite arm $30^a$ of said member 30 is in operative relation to a bar 36 vertically movable and provided on its face toward the arm $30^a$ with a notch 37 having oppositely arranged beveled faces, and provided both above and below said notch with shoulders $37^a$ and $37^b$ respectively, and which bar is normally pressed toward the arm $30^a$ by a spring 38 carried by an extension from handle 17, and is prevented from undue movement away from said arm by a guiding lug 39 also carried by the handle 17. The bar 36 is pivotally connected at 40 to a bar 41 vertically movable on the handle 17 and surrounded by helical spring 42 bearing at its opposite ends against collars 43 which are pinned to said bar and which seat against brackets 44 provided on the handle 17. The arrangement here is such that when the bar 41 is either lifted or depressed, the spring 42 is put under tension, and serves to restore bar 41 to its normal position when released.

The vertically movable and laterally yielding bar 36, provided with the beveled faces 37 and shoulders $37^a$ and $37^b$, together with the coöperating arm $30^a$, constitute in effect a ratchet mechanism.

The upper end of bar 41 is connected by link 45 to an oscillating handle grip 46 pivotally secured to handle 17, at 47, and which oscillating member 46, in Fig. 1, is shown provided with a pair of grips $46^a$ and $46^b$, while the handle 17 is provided with a grip $17^a$ lying between the grips $46^a$ and $46^b$. In the modification shown in Fig. 15, there is only a single grip $46^c$ pivoted to handle 17 and provided with stops $46^d$ and $46^e$ arranged to coöperate with handle 17, these parts taking the place of the three grips shown in Fig. 1. By moving either one of the hand grips $46^a$ or $46^b$ toward the grip $17^a$, in Fig. 1, (or moving the single grip $46^c$ of Fig. 15 either to the right or the left) the engineer can either elevate or depress the bar 41, as desired, depending upon the direction in which he wishes to move the handle 17.

The handle 17 is held against accidental or unintentional movement in either direction by means of a pair of locking plungers 48 and $48^a$ which are slidably mounted in the handle 17 and are arranged to engage on the opposite edges of the locking bar 16, and are held in engaging position with said bar by means of springs 49 interposed between said plungers and a bridge member secured to the handle 17. Each of the plungers 48, $48^a$ is provided with a portion 50 overhanging the sliding bar 41 which is provided with a pair of oppositely arranged wedge-shaped or beveled projections 51, $51^a$, one above and the other below the locking plungers 48, 48ª, and which wedges are adapted, when the bar 41 is moved, to engage the overhanging portions 50 and retract the plungers 48, 48ª, to disengage the same from the locking bar 16. When, for instance, the bar 41 is depressed, the wedge 51 is brought underneath locking plunger 48 and retracts the latter so as to permit movement of the lever 17 toward the right (viewing Figs. 1 and 2), whereas, when the handle grips are actuated to lift the bar 41, the wedge 51ª is brought underneath the overhanging portion of plunger 48ª, thus retracting the same from engagement with the locking bar 16 and permitting movement of the handle 17 toward the left (viewing Figs. 1 and 2). The handle 17 is further locked against movement by means of a vertically slidable locking dog 52 provided at its lower end with a series of long teeth arranged to engage the long teeth 53 on the stationary segment 14. The dog 52 is provided at its upper end with a cross slot 54 in which moves a roller 55 carried by a downward extension 56 on the oscillating handle grip member 46, so that in whichever direction said member 46 is oscillated on its pivot 47, the locking dog 52 will be lifted and disengaged from the rack bar 53 to permit movement of the handle 17 in either direction, depending upon which one of the locking plungers 48 or 48ª has been retracted.

The upper end of locking bar 16 is provided with a finger 57, having its sides beveled in opposite directions, as shown in Fig. 6, and coöperating with the same is a plunger 58 carried by the handle 17 and normally pressed inwardly by means of spring 59 interposed between said plunger and a bridge 59ª carried by handle 17. The plunger 58 is provided at its outer end with a projection 58ª extending laterally toward the sliding bar 41, and the latter is provided with a lateral projection 58ᵇ extending toward said plunger and into the path of movement of the projection 58ª and provided with top and bottom faces arranged, when the plunger 58 is pressed inwardly, to abut against the projection 58ª and be stopped thereby. The cross slot 54 in the locking dog 52 is of such width as to provide clearance above the roller 55, so that as soon as the engineer releases the handle grip member 46 said locking dog will fall fully downwardly into locking engagement with the teeth 53 on segment 14, but the sliding bar 41 will be held from full movement downward (or upward as the case may be, depending upon the direction in which the handle grip member 46 has been moved), by its projection 48ᵇ contacting with the projection 58ª on the plunger 58, but when the reversing piston is moved to the desired extent, the finger 57 on the locking bar 16 will push the plunger 58 outwardly and thereby disengage its projection 58ª from the projection 58ᵇ on the sliding bar 41, whereupon the spring 42 will immediately fully depress (or elevate as the case may be) said sliding bar 41. Consequently the full locking engagement of the dog 52 with the segment 14 is effected as soon as the engineer releases the handle grip member 46. Should the engineer thoughtlessly fail to fully release the handle grip, the clearance in the slot 54 nevertheless permits the locking dog to drop fully down into the teeth 53 and consequently no binding can occur as would be the case if the teeth on the locking dog 52 only entered part way into the teeth 53 of the stationary segment 14. As soon as the finger 57 retracts plunger 58, the bar 41 is released and the spring 42 will quickly restore the bar to normal position, and the jar produced thereby on the handle grip will advise the engineer, in case he has retained hold on the handle grip, that he should remove his hand. Positive and certain action is therefore insured even if the engineer thoughtlessly fails to fully release the handle grip.

The casing of the valve mechanism is provided with an inlet 60 for the motive fluid to the chamber 21 above the rotary disks in said casing, and the valve seat 23 is provided with three ports, to-wit, port 61, connected by pipe 62 to the end 1ª of cylinder 1, with port 63 connected by pipe 64 to the opposite end 1ᵇ of cylinder 1, and with ports 65 connected by pipe 66 to the chamber 11ª of the lock actuating cylinder 11.

The lower rotary disk 24 is provided with three ports, marked 68, 69 and 70 respectively, which extend entirely through said disk and which communicate with arc-shaped grooves (shown in dotted lines, Fig. 9) on the lower face of said disk, which grooves are of such length that communication between the ports in the valve seat and the ports through said disk is not broken by the rotation of the disk 24 to the extent permitted by the actuating connections.

In order to reduce friction, the top disk 25 is cut away in part so as to leave segments or projections which alone contact with the valve seat on the lower disk and control the ports through the latter. As shown, said disk 25 has a segment or projection 71 provided with a pair of circular ports 72 each connected by a radial passage 73 with a hollow 74 in the stem of said valve, which hollow 74 forms the exhaust, said projection 71 being cut into by a radial groove 75; and a pair of segments or projections 76 and 77 provided respectively with cavities 78 and 79 connected by radial passages 80 with the hollow 74 of the stem of said valve, and which projections 76 and 77 are cut away respectively at 81 and 82.

Normally the handle 17 is in the position shown in Figs. 1 and 2, being held between the locking plungers 48, 48ª, on each side thereof, and with the locking dog 52 engaging the teeth 53 of segment 14, and being in its fully lowered position,—the plunger 58 being held outwardly by finger 57 on the locking bar 16. In this position piston 2 is midway of the length of cylinder 1, and the valve mechanism is in the position shown in Fig. 11 in which the ports 68, 69 and 70 of the first rotary disk register with the ports 61, 63 and 65 in the valve seat, and cavities 78 and 79 of the second disk register respectively with ports 68 and 69 and thus connect both ends of cylinder 1 through radial passages 80 with the exhaust 74; while the radial groove 75 in the segment 71 permits motive fluid to pass to port 70 and thence to port 65 connected to cylinder 11 of the reversing rod locking device. Consequently in this position both ends of the power cylinder 1 are at atmospheric pressure, but the reversing rod is locked so that accidental movement of the reversing link mechanism cannot occur. To shift the valve gear, the engineer moves one of the handle grips 46ª or 46ᵇ (or moves the single hand grip 46ᶜ in one direction or the other) depending upon the direction in which he wishes to shift the handle 17. When he wishes to shift said handle toward the right (Fig. 1) he grasps the grips 46ª and 17ª (or moves the single grip 46ᶜ toward the right) thus rotating the member 46 and depressing the bar 41 and retracting locking plunger 48, whereas, if he wishes to shift handle 17 to the left, he grasps the hand grips 46ᵇ and 17ª (or moves the single grip 46ᶜ toward the left), thus rotating the member 46 and lifting the bar 41 and retracting the locking plunger 48ª. In the former case the valve gear will be shifted to drive the engine, say, forwardly, and in the latter case to reverse the engine. Assuming that the engineer wishes to drive the engine forwardly, he will actuate the hand grips so as to depress the bar 41, thereby causing the inclined projection 51 to retract the locking plunger 48 and permit movement of the handle 17 to the right. At the same time the roller 55 working in the cross groove 54 of the dog 52 lifts the latter to disconnect it from the stationary rack teeth 53. The handle 17 is thus free to be moved to the right to any desired position.

The downward movement of bar 41 causes the bar 36 to move downwardly, and the inclined faces of notch 37 will engage the end of arm 30ª and slide past the same without producing any movement of the latter, the spring 38 yielding to permit the bar 36 to swing outward slightly to permit this movement. As soon, however, as said bar 36 has been moved fully downwardly, the spring 38 slightly advances the same and thus brings shoulder 37ª underneath the end of arm 30ª. Consequently in the downward movement of bar 41 produced by the unlocking of the handle 17 from the rack of the stationary segment 14, no movement whatsoever of the valve mechanism occurs and consequently the reversing rod mechanism still remains active, while both ends of the actuating cylinder 1 remain at atmospheric pressure. Consequently it is absolutely impossible for the valve reversing mechanism to move during the time that the engineer is moving the handle 17 to the desired position, and no matter how slow the engineer may be or to what extent he may pause between the beginning and completion of such movement, no valve movement of the disk valves of the reversing mechanism can possibly occur.

In the downward movement of bar 41, the spring 42 is compressed, so that as soon as the handle 17 has been moved to the desired position and the engineer releases the hand grips, this spring expands and partially restores bar 41 to its raised position, thus positively moving the locking dog 52 downwardly to cause its teeth to engage the teeth 53 of the segment 14. Due to the clearance of the cross slot 54, the locking dog drops fully down into the teeth 53 and locks the handle in its newly adjusted position, but the bar 41 is not fully lifted due to the fact that when the handle was moved from its original position, the plunger 58 moved off from the finger 57 on locking bar 16 and was thrust inwardly by spring 59. Consequently when the bar 41 moves upwardly, it is stopped by its projection 58ᵇ contacting with the projection 58ª on plunger 58, in which position said bar will remain until said plunger 58 is again retracted by finger 57 as will hereinafter appear. In this partial upward movement of bar 41, by spring 42, the shoulder 37ª acting against the end of arm 30ª imparts a rotary movement to the upper disk 25 of the valve mechanism, in a contra-clockwise direction, to the direction shown in Fig. 12. During the movement of the handle 17 both disks 24 and 25 were moved with the same, but without in any way disturbing their relative positions, because the arc-shaped slots on the lower disk 24 are long enough not to break connection with the ports in the valve seat. Hence the movement of the two disks produced no change whatsoever in the valve mechanism, as a consequence of which the reversing rod remained locked so that there could be no kickback which would be likely to injure the engineer. But when the bar 41 is moved upwardly by spring 42, and rotates the upper disk 25 in a direction contra-clockwise to the position shown in Fig. 12, one of the ports 72 of the top disk registers with port 70 of the bottom disk and thus connects the reversing bar locking cylinder 11 to the exhaust, thus unlocking the reversing bar; while cavity 79 still registers with port 69, thus maintaining the end 1$^b$ of the cylinder 1 at atmospheric pressure, but the cut away part 81 uncovers port 68, thus permitting fluid pressure to flow to the opposite end 1$^a$ of cylinder 1 and move the reversing rod 4. This movement of the reversing rod, through the arm 16$^a$, moves the locking bar 16, and when the latter reaches the limit of its movement, its beveled finger 57 comes underneath plunger 58 and retracts the latter, thus permitting the spring 42 to fully expand, further lifting the bar 41, and rotating the arm 30$^a$ to such an angular position that it can slide past the shoulder 37$^a$, whereupon the spring 34, which has been placed under compression when the member 30 was rotated by the upward movement of bar 41, expands and restores said member 30 to normal position, thereby rotating the upper disk 25 clockwise and bringing it back to its normal position relative to disk 24, in which position exactly the same port connections are established as in the normal position (Fig. 11), in which both ends of the cylinder 1 are connected to the exhaust and thus restored to atmospheric pressure, and at the same time fluid pressure is again admitted to the reversing rod cylinder 11, thus again locking the same and holding the valve gear against further or accidental movement.

When it is desired to reverse the engine, the handle 17 is merely moved in the opposite direction from that above described, to-wit, to the left, and this is accomplished by the engineer grasping the hand grips 46$^b$ and 17$^a$ (or moving the handle grip 46$^c$ toward the left). When this is done the bar 41 is lifted (instead of depressed) and the shoulder 37$^b$ clicks past the arm 30$^a$ (the spring 38 yielding to allow this) until said shoulder lies above said arm. When the lever has been moved to the desired extent to the left, and the hand grips are released, the spring 42 depresses bar 41, and rotates the valve disks in the opposite direction from that above described, that is, clockwise, to the position shown in Fig. 13, to produce exactly the same results as above described, except that in this case the port 68 is still connected to the exhaust, while port 69 is uncovered by the cut away part 82 to admit fluid pressure to the end 1$^b$ of cylinder 1, and cause movement of the reversing rod in the opposite direction from that before described.

It will thus be seen that the valve mechanism described is so arranged that the reversing rod is locked at all times (including the time of movement of handle 17) except only immediately after the handle grips have been released and the locking dog 52 has dropped half way down, at which time only motive fluid is exhausted from the reversing rod locking cylinder 11 and admitted to one or the other end of cylinder 1 to cause movement of the reversing rod and link mechanism. As soon, however, as the reversing rod has moved to the desired position, the finger 57 pushes the plunger 58 outwardly and thus permits the sliding bar 41 to be restored to normal position, thus causing whichever shoulder 37$^a$ or 37$^b$ happens to be in contact with the arm 30$^a$, to rotate said arm 30$^a$ still farther in the direction in which it was before rotated, until said arm reaches such angular position that it escapes past said shoulder, whereupon the spring 34 rotates the upper disk 25 in the opposite direction, to restore it to its normal position relative to the disk 24, and thereby automatically admitting fluid pressure to the reversing rod locking cylinder 11 and exhausting it from the cylinder 1. As a result the reversing link mechanism can not possibly move at any time during the movement of the handle 17, so that there can be no kickback during the time that the engineer is moving the handle 17,—nor at any other time except the short interval above described, so that said link mechanism can not be moved no matter how slow the engineer may be. The parts are all positively moved and held in adjusted position so that the link mechanism can not accidently jar out of position to which it is set.

The valve mechanism described insures the movement of the valve gear positively to the desired extent and requires no attention of the engineer other than to unlock the handle 17 by either lifting or depressing the bar 41 and then move the handle to the desired position. All of the other operations take place entirely automatically. The engineer can not move the handle 17 except in the direction of the particular locking plunger 48 or 48$^a$ which has been retracted. The necessary movements of the bar 41 and of the valve mechanism to secure the automatic actions above described are effected positively by means of the springs 42 and 34 respectively.

In case the power mechanism becomes inoperative from any cause, it is only necessary to disconnect the operative connections between hand grip 36 and the valve mechanism, such for instance as removing either the pivot bolt 40 or disconnecting one end of link 45, whereupon the reversing gear can be shifted by the handle for the reason that the upper end of the locking bar 16 is held between the plungers 48 and 48$^a$ on handle 17 and must therefore move with said handle, while its extension 16$^a$ connects directly to the reversing rod 4.

Various modifications can be made in the valve mechanism and the means for actuating the same, without departing from the spirit of the invention.

What I claim is:—

1. In valve reversing mechanism, the combination of a reversing fluid pressure motor, a reversing rod actuated thereby, a locking device for said rod, valve mechanism controlling the supply and exhaust of fluid pressure to and from the two sides of said motor, an actuating handle, means for locking said handle in its various positions, and connections between the handle locking means and the valve mechanism and the rod locking device, so arranged as to leave the valve mechanism and the rod locking device undisturbed when unlocking the handle and moving the handle to the desired position, and to actuate the rod locking device and valve mechanism to release the rod locking device and admit fluid pressure to one side of the motor when the handle locking means assumes a position for locking the handle.

2. In valve reversing mechanism, the combination of a reversing fluid pressure motor, a reversing rod actuated thereby, a locking device for said rod, valve mechanism controlling the supply and exhaust of fluid pressure to and from the two sides of said motor, an actuating handle, means for locking said handle in its various positions, connections between the handle locking means and the valve mechanism and the rod locking device, so arranged as to leave the valve mechanism and the rod locking device undisturbed when unlocking the handle and moving the handle to the desired position, and to actuate the rod locking device and valve mechanism to release the rod locking device and admit fluid pressure to one side of the motor when the handle locking means assumes a position for locking the handle, and means actuated from the reversing rod when it has moved the desired distance for automatically restoring the rod locking device to locking condition and restore the normal connections of the valve mechanism to exhaust the reversing motor.

3. In valve reversing mechanism, the combination of a reversing fluid pressure motor, a reversing rod actuated thereby, a locking device for said rod, valve mechanism for controlling the supply and exhaust of fluid pressure to and from the two sides of said motor, an actuating handle, means for locking said handle in its various positions, connections between the handle locking means and the valve mechanism and the rod locking device so arranged as to maintain the rod locking device in locking condition and the reversing motor exhausted when moving the handle to the desired position, and to release said rod locking device and admit fluid pressure to one side of the motor when the handle locking means assumes a position to lock the handle, a spring put under tension when the handle locking means assumes a position to lock the handle, and means actuated from the reversing rod when it has moved the desired distance for releasing said spring and enable the latter to restore the rod locking device to locking condition and the valve mechanism to normal condition to release fluid pressure from the reversing motor.

4. In valve reversing mechanism, the combination of a reversing fluid pressure motor, a reversing rod actuated thereby, a locking device for said rod, valve mechanism for controlling the supply and exhaust of fluid pressure to and from the two sides of said motor, an actuating handle, means for locking said handle in its various positions, connections between the handle locking means and the valve mechanism and the rod locking device so arranged as to maintain the rod locking device in locking condition and the reversing motor exhausted when moving the handle to the desired position, and a spring put under tension by the act of releasing the handle locking means in order to move the handle, said spring acting when the handle locking means assumes a position to again lock the handle to release the rod locking device and admit fluid pressure to one side of the reversing motor.

5. In valve reversing mechanism, the combination of a reversing fluid pressure motor, a reversing rod actuated thereby, a locking device for said rod, valve mechanism for controlling the supply and exhaust of fluid pressure to and from the two sides of said motor, an actuating handle, means for locking said handle in its various positions, connections between the handle locking means and the valve mechanism and the rod locking device so arranged as to maintain the rod locking device in locking condition and the reversing motor exhausted when moving the handle to the desired position, a spring put under tension by the act of releasing the handle locking means in order to move the handle, said spring acting when the handle locking means assumes a position to again lock the handle to release the rod locking device and admit fluid pressure to one side of the reversing motor, a second spring put under tension when the handle locking means assumes a position to lock the handle, and means actuated from the reverse rod when it has moved to the desired distance for releasing said second named spring and enable it to restore the rod locking device to its locking condition and the valve mechanism to its normal condition to exhaust fluid pressure from the reversing motor.

6. In valve reversing mechanism, the combination of a reversing fluid pressure motor, a reversing rod actuated thereby, a fluid pressure actuated locking device for said rod, valve mechanism controlling the supply and exhaust of fluid pressure to and from the two sides of said motor and to and from said rod locking device, an actuating handle for said valve mechanism, means for locking said handle in its various positions, and connections between the handle locking means and the valve mechanism so arranged as to leave the connections of the valve mechanism undisturbed when unlocking the handle and moving the handle to the desired position and to actuate said valve mechanism to exhaust fluid from the rod locking device and admit fluid pressure to one side of the reversing motor when the handle locking means assumes a position to lock the handle.

7. In valve reversing mechanism, the combination of a reversing fluid pressure motor, a reversing rod actuated thereby, a fluid pressure actuated locking device for said rod, valve mechanism controlling the supply and exhaust of fluid pressure to and from the two sides of said motor and to and from said rod locking device, an actuating handle for said valve mechanism, means for locking said handle in its various positions, connections between the handle locking means and the valve mechanism so arranged as to leave the connections of the valve mechanism undisturbed when unlocking the handle and moving the handle to the desired position and to actuate said valve mechanism to exhaust fluid from the rod locking device and admit fluid pressure to one side of the reversing motor when the handle locking means assumes a position to lock the handle, and means actuated from the reversing rod when it has moved the desired distance for automatically restoring the normal connections of the valve mechanism to exhaust fluid pressure from the reversing motor and simultaneously admit fluid pressure to the rod locking device.

8. In valve reversing mechanism, the combination of a reversing fluid pressure motor, a reversing rod actuated thereby, a fluid pressure actuated locking device for said rod, valve mechanism controlling the supply and exhaust of fluid pressure to and from the two sides of said motor and to and from said rod locking device, an actuating handle for said valve mechanism, means for locking said handle in its various positions, connections between the handle locking means and the valve mechanism so arranged as to leave the connections of the valve mechanism undisturbed when moving the handle to the desired position and to actuate said valve mechanism to exhaust fluid from the rod locking device and admit fluid pressure to one side of the reversing motor when the handle locking means assumes a position to lock the handle, a spring put under tension when the handle locking means assumes a position to lock the handle, and means actuated from the reversing rod when it has moved the desired distance for releasing said spring and enable it to restore the normal connections of the valve mechanism to exhaust fluid pressure from the reversing motor and simultaneously admit fluid pressure to the rod locking device.

9. In valve reversing mechanism, the combination of a reversing fluid pressure motor, a reversing rod actuated thereby, a fluid pressure actuated locking device for said rod, valve mechanism controlling the supply and exhaust of fluid pressure to and from the two sides of said motor and to and from said rod locking device, an actuating handle for said valve mechanism, means for locking said handle in its various positions, connections between the handle locking means and the valve mechanism so arranged as to leave the connections of the valve mechanism undisturbed when moving the handle to the desired position, and a spring put under tension by the act of releasing said handle locking means and serving when said handle locking means assumes a position to again lock the handle, to actuate said valve mechanism to exhaust fluid pressure from the rod locking device and admit fluid pressure to one end of the reversing motor.

10. In valve reversing mechanism, the combination of a reversing fluid pressure motor, a reversing rod actuated thereby, a fluid pressure actuated locking device for said rod, valve mechanism controlling the supply and exhaust of fluid pressure to and from the two sides of said motor and to and from said rod locking device, an actuating handle for said valve mechanism, means for locking said handle in its various positions, connections between the handle locking means and the valve mechanism so arranged as to leave the connections of the valve mechanism undisturbed when moving the handle to the desired position, a spring put under tension by the act of releasing said handle locking means and serving when said handle locking means assumes a position to again lock the handle, to actuate said valve mechanism to exhaust fluid pressure from the rod locking device and admit fluid pressure to one side of the reversing motor, a second spring put under tension when the handle locking means again assumes a position to lock the handle, and means actuated from the reversing rod when it has moved the desired distance for releasing said second named spring and enable it to restore the normal conditions of the valve mechanism to exhaust fluid pressure from the reversing motor and simultaneously admit fluid pressure to the rod locking device.

11. In valve reversing mechanism, the combination of a reversing fluid pressure motor, a reversing rod actuated thereby, a locking device for said rod, valve mechanism for controlling the supply and exhaust of fluid pressure to and from the two sides of said motor, an actuating handle, means for locking said handle in its various positions, connections between the handle locking means and the valve mechanism and the rod locking device, means permitting said valve actuating connections to move only partially to normal position when the handle locking means assumes locking position, said connections being so arranged as to maintain the rod locking device in locking condition and the reversing motor exhausted when moving the handle to the desired position and to release said rod locking device and admit fluid pressure to one side of the motor when the handle locking means assumes locking position and the valve actuating connections are moved only partially to normal position, and means actuated from the reversing rod when it has moved to the desired distance for permitting said valve actuating connections to move fully to normal position and thereby restore the rod locking device to locking condition and exhaust the fluid pressure from said reversing motor.

12. In valve reversing mechanism, the combination of a reversing fluid pressure motor, a reversing rod actuated thereby, a fluid pressure actuated locking device for said rod, valve mechanism controlling the supply and exhaust of fluid pressure to and from the two sides of said motor and to and from said rod locking device, an actuating handle for said valve mechanism, means for locking said handle in its various positions, connections between the handle locking means and the valve mechanism, means permitting said valve actuating connections to move only partially to normal position when the handle locking means assumes locking position, said connections being so arranged as to leave the valve mechanism undisturbed when moving the handle to the desired position and to actuate said valve mechanism to exhaust fluid pressure from the rod locking device and admit fluid pressure to one side of the reversing motor when the handle locking means assumes locking position, and means actuated from the reversing rod when it has moved to the desired distance for permitting the valve actuating connections to move fully to normal position and thereby automatically restore the normal conditions of the valve mechanism to exhaust fluid pressure from the reversing motor and simultaneously admit fluid pressure to the rod locking device.

13. In valve reversing mechanism, the combination of a reversing fluid pressure motor, a reversing rod actuated thereby, a fluid pressure actuated locking device for said rod, valve mechanism controlling the supply and exhaust of fluid pressure to and from the two sides of said motor and to and from said rod locking device, an actuating handle for said valve mechanism, means for locking said handle in its various positions, and connections between the handle locking means and the valve mechanism including a ratchet device and a spring put under tension when the handle locking means is moved to unlock the handle, whereby upon movement of the handle the connections of the valve mechanism are left undisturbed and upon the handle locking means assuming a position to again lock the handle after being moved, the spring actuates the valve mechanism to exhaust fluid pressure from the rod locking device and admit fluid pressure to one side of the reversing motor.

14. In valve reversing mechanism, the combination of a reversing fluid pressure motor, a reversing rod actuated thereby, a fluid pressure actuated locking device for said rod, valve mechanism controlling the supply and exhaust of fluid pressure to and from the two sides of said motor and to and from said rod locking device, an actuating handle for said valve mechanism, means for locking said handle in its various positions, connections between the handle locking means and the valve mechanism including a ratchet device and a spring put under tension when the handle locking means is moved to unlock the handle, whereby upon movement of the handle the connections of the valve mechanism are left undisturbed and upon the handle locking means assuming a position to again lock the handle after being moved, the spring actuates the valve mechanism to exhaust fluid pressure from the rod locking device and admit fluid pressure to one side of the reversing motor, a second spring put under tension when the valve mechanism is moved by said ratchet connection, and means actuated from the reversing rod when it has moved the desired distance for disconnecting said ratchet mechanism from said valve mechanism, whereby said second spring restores the normal conditions of the valve mechanism to exhaust fluid pressure from the reversing motor and simultaneously admit fluid pressure to the rod locking device.

15. In valve reversing mechanism, the combination of a reversing fluid pressure motor, a reversing rod actuated thereby, a fluid pressure actuated locking device for said rod, valve mechanism controlling the supply and exhaust of fluid pressure to and from the two sides of said motor and to and from said rod locking device, an actuating handle for said valve mechanism, means for locking said handle in its various positions, and connections between the handle locking means and the valve mechanism so arranged as to prevent actuation of the latter until the handle locking means has moved to position to lock said handle.

In testimony whereof, I have hereunto set my hand.

JACOB RUSH SNYDER.

Witnesses:
 GLENN H. LERESCHE,
 A. E. JOHNSON.